Aug. 12, 1969

N. M. REITZEL 3,461,031

APPARATUS FOR REGULATING STOCK LEVEL IN A HEADBOX

Filed Sept. 28, 1965

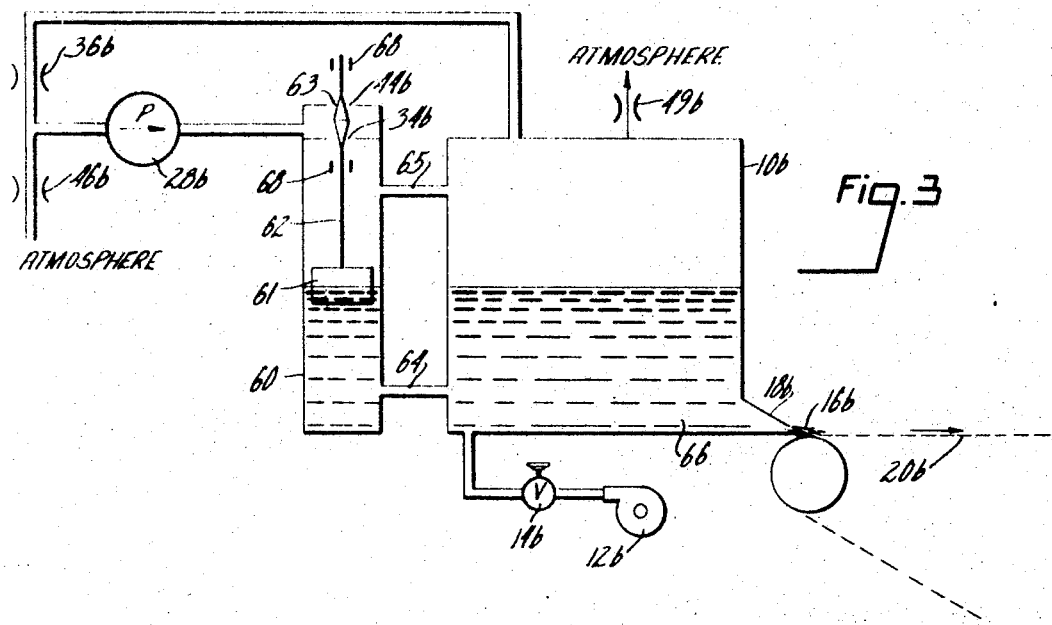
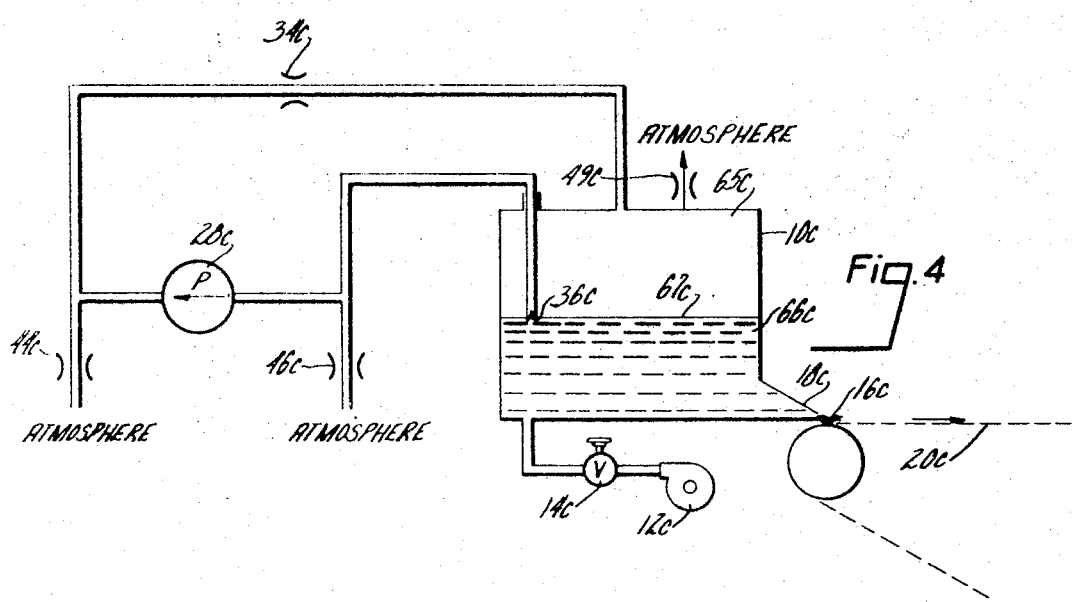

United States Patent Office 3,461,031
Patented Aug. 12, 1969

3,461,031
APPARATUS FOR REGULATING STOCK LEVEL IN A HEADBOX
Nicolas M. Reitzel, Boylston, Mass., assignor to Rice Barton Corporation, Worcester, Mass., a corporation of Massachusetts
Filed Sept. 28, 1965, Ser. No. 490,893
Int. Cl. D21f 1/02, 1/06; F04f 1/00
U.S. Cl. 162—259                                6 Claims

ABSTRACT OF THE DISCLOSURE

A device for regulating the fluid pressure in a chamber comprising a fluid pump having both its discharge and intake ends connected simultaneously, through at least partially open orifices, both to the chamber and to a constant pressure fluid reservoir, at least one of these orifices having its fluid discharge coefficient variable in response to a signal from a flow regulator to change the chamber fluid pressure over a continuous range of pressures, thereby including the range of pressures spanning the constant pressure. The device is particularly useful for regulating the stock level in an air loaded headbox, utilizing an air pump; conveniently, the atmosphere as a constant pressure reservoir; and a stock level sensor for transmitting the appropriate signal.

---

This invention relates to the regulation of fluid pressure in pressure chambers, and has particular application to the regulation of stock level in an air loaded headbox for a paper making machine through air pressure adjustments in the headbox.

A primary object of the invention is to provide a device for regulating fluid pressure in a chamber, capable of varying such pressure over a continuous range spanning the pressure of a fluid reservoir connected to said chamber.

A further object of the invention is to provide a novel sensing and controlling device for reversing stock level changes in air-loaded paper making machine headbox by sensing the changes and automatically producing appropriate corrective changes in headbox air pressure over any desired continuous range of pressures, including ranges spanning atmospheric pressure, all with a minimum of parts and cost and with high accuracy and reliability.

The invention features a fluid pump connected at both its intake and discharge ends to a constant pressure fluid reservoir and to the chamber in which fluid pressure is variable. Through adjustments of fluid flow characteristics in one or more of the connecting fluid conduits the chamber fluid pressure is variable over a wide range of pressures spanning the constant supply pressure. In a preferred embodiment a sensor senses stock level changes in an air loaded headbox of a paper making machine, providing a signal which controls a three-way valve, the valve serving to simultaneously adjust, in opposite sense, the air discharge coefficients in the two conduits connecting the pump to the atmosphere.

Other objects, advantages, and features of the invention will appear from the following description of a preferred embodiment thereof as applied to an air loaded headbox, taken together with the accompanying drawings, in which:

FIG. 1 is a schematic diagram of the control device itself;

FIG. 2 is a schematic diagram of the control device of the invention arranged to control the pressure above the stock in the headbox of a Fourdrinier paper machine;

FIG. 3 is a partially schematic diagram of another embodiment of the invention; and FIG. 4 is a partially schematic diagram of another embodiment of the invention.

Referring now more particularly to the drawings, there is shown in FIG. 2 an airloaded headbox 10 supplied with paper stock by fan pump 12 through valve 14. The stock is spouted at 16 from the headbox through the slice 18 onto the Fourdrinier wire assembly 20.

Changes in the level of the stock in the headbox are sensed by a sensor in the form of a level sensing mechanism 22 of the usual kind giving a signal, which operates a standard valve control mechanism 24. In turn, the control 24 regulates the position of a three-way valve 26, in a manner tending to maintain the headbox level constant.

A positive displacement air pump 28 is placed in communication with the headbox at its discharge end by a conduit 30 and at its intake end by the conduit 32, these conduits in turn communicating with the headbox 10 through the fixed orifices 34, 36 and a common conduit 38. The gauge 39 indicates headbox pressure. Orifice 49, connecting headbox air space to atmosphere represents schematically all air leakages between headbox and atmosphere.

The discharge end of the pump 28 communicates with the atmosphere through a conduit 40 connected to port 44 of the three-way valve 26 and through an adjustable valve element to port 48, while the intake end also communicates with atmosphere through conduit 42 connected to port 46, and through a similarly adjustable valve element to port 48 of the valve 26. Valve 26 operates to vary the air discharge coefficients to or from the atmosphere (measured in units of volume/time/pressure) of ports 44, 46 over a continuous range, closing port 44 (with port 46 fully open) at one extreme and closing port 46 (with port 44 fully open) at the other extreme. In its intermediate or midrange position, ports 44, 46 are partially closed.

In operation, when valve 26 is in an intermediate position, the continuously running pump 28 will maintain a constant headbox air pressure with the headbox stock at a set level. If, due to stock feed rate fluctuations or slice adjustment the headbox stock level should drop, control 24 will automatically actuate valve 26 to decrease the discharge coefficient of (i.e., restrict) port 46 and increase that of port 44, thereby lowering the headbox air pressure and in turn causing an increase in the stock level. Similarly, in response to an increase in stock level, the discharge coefficient of port 46 is increased and that of port 44 decreased, thereby raising the headbox air pressure until the stock level increase is reversed.

The available range of headbox pressures is dependent on the dimensions of orifices 34, 36, the flow characteristics of valve 26, the headbox leakage represented by orifice 49, and the pressure-volume characteristics of pump 28.

In the design of a satisfactory system according to the invention, pump 28 is selected to provide a sufficient volume of discharge under all conditions to permit pumping air into or out of the headbox at a sufficiently fast rate to maintain control of liquid level under the widest transient range of pressure requirements. In particular, on start-up, when the headbox is initially empty of liquid upon, opening stock valve 14 to put the headbox into operation, the capacity of pump 28 must be sufficient to build up air pressure or vacuum within the box before the inrush of liquid can flood the box or before the sealing effect of liquid at the slice is lost. A pump with capacity in standard cubic feet per minute of air greater than 67% of the empty volume of the headbox gives the minimum satisfactory control of transient changes in operating conditions. A larger pump capacity will give faster transient response if necessary and permit greater leakage of air in the headbox structure. However, larger pump capacity will result in larger power consumption and increase the size of all components of system, thereby increasing initial and operating costs.

The valve 26 is of sufficient size so that, when either port is wide open, the pressure drop between pump and atmosphere will be small (less than 0.2 p.s.i.).

After selection of pump and control valve sizes, the sizes of orifices 34 and 36 are ordinarily determined by an iterative process using known formulas for flow of a compressible fluid through an orifice.

In an actual example, a system was designed to produce an air pressure range of 14.1 to 15.7 pounds per square inch absolute in a headbox of 80 cubic feet volume and with a leakage corresponding to an orifice of 0.11 square inch area. A positive displacement pump with a capacity of 63 standard cubic feet per minute with inlet at atmospheric pressure was selected. A threeway valve with a coefficient of discharge (Cv) of 16.4 was selected to match the pump, where Cv is defined by the formula:

$$Cv = \frac{Q}{\sqrt{\Delta P \cdot P_2}}$$

where

Q = air flow—standard cubic feet per minute
ΔP = pressure drop—pounds per square inch
$P_2$ = downstream pressure—pounds per square inch absolute To allow for various unknown factors and to give a margin of safety in design, it was assumed that valve should operate over a range of 20 to 80% of full stroke. According to the valve characteristics, this stroke results in values of Cv of 1.5 to 15.2.

Using these values for valve and pump, sizes of orifices were determined of 25/32 inch diameter for orifice 34 and 47/64 inch diameter for orifice 36.

The operating conditions tabulated below were calculated:

| Headbox Air Pressure, p.s.i.a. | Valve percent Stroke | Cv Discharge Valve | Cv Suction Valve | Pump inlet Pressure, p.s.i.a. | Pump Discharge Pressure, p.s.i.a | Pump Power H.P. |
|---|---|---|---|---|---|---|
| 14.1 | 20 | 15.2 | 1.5 | 12.5 | 14.8 | 3.1 |
| 15.7 | 80 | 1.5 | 15.2 | 14.6 | 16.7 | 3.6 |

In actual installation of an air pressure control system of the above design, the operating conditions were found to correspond with the calculated values within 10% and the desired control range was easily achieved within the range of stroke of the three-way valve. The transient response was also adequately fast.

The invention in its broader aspect is shown schematically in FIG. 1, wherein the fluid pump 28a is shown connected at each end to a chamber 50 through orifices 34a, 36a and to a constant pressure fluid reservoir 52 through orifices 44a, 46a. Chamber 50 may be connected, through another orifice (not shown) to another reservoir, or to reservoir 52, or may be left isolated except for connections through orifices 34a and 36a. By adjusting the fluid discharge coefficient of any one of the orifices 34a, 36a, 44a, 46a the fluid pressure in the chamber 50 may be controlled over a desired range. Preferably as in the embodiment of FIG. 2, a pair of orifices will be cooperatively adjusted, thereby increasing the available range of chamber pressures since chamber pressure is, upon analysis, found to be dependent upon ratios of orifice discharge coefficients. Also as in the embodiment of FIG. 2, the regulation of the adjustable orifice or orifices may be made automatically responsive to variation of a desired predetermined standard. Finally, in every case the available range of chamber pressures will, if desired, span without discontinuity the constant pressure of fluid reservoir 52.

FIG. 3 shows another embodiment of the invention in which the need for providing the separate and auxiliary valve, sensor, and controller of the embodiment of FIG. 2 is eliminated. Conduits 64, 65 respectively connect the liquid and air portions of the headbox 10b to the corresponding portions of reference column 60 exterior to the headbox. Liquid fills the column to form an air-liquid interface at the same level as the interface within the headbox. Float 61 in column 60 is connected to a valve element 63 by rod 62 moving in guides 68. Element 63 is tapered at opposite ends which extend into and simultaneously control the flow characteristics of orifices 34b, 44b at the top of column 60. Any change of level of the column liquid level causes a corresponding change in the position of valve element 63, changing the flow characteristics of variable orifices 34b and 44b in opposite sense. Air pump 28b is connected on the intake side to the atmosphere through variable orifice 44b and, through variable orifice 34b, into column 60 and thence, through conduit 65, to the headbox air space. A change in the column 60 liquid level will move valve element 63 with respect to orifices 34b and 44b, changing the ration of their flow coefficients to change to correct the air pressure supplied to the headbox air space in a sense to hold the level constant. The controlled level may be varied by moving float 61 relative to valve element 63 along rod 62, to control level at any desired point.

FIG. 4 shows another embodiment of the invention in which the liquid level in the headbox acts directly on an orifice in one of the conduits connecting the headbox air space to the pump to change the air flow coefficient of the orifice to produce changes in air pressure in the air space of the headbox in a sense to maintain the liquid level in the headbox relatively constant. Air pump 28c is connected on the discharge side to the headbox air space through fixed orifice 34c, and to the atmosphere through fixed orifice 44c. The air pump 28c is connected on the intake side to the atmosphere through fixed orifice 46c and to the headbox through variable orifice 36c. The variable orifice 36c is located partially submerged in and non-parallel to the surface of the headbox stock. A rise in level will reduce the area of the orifice open to air flow and thus increase the air flow resistance of orifice 36c thereby increasing the air pressure supplied to the headbox air space and reversing the increase in level. A decrease in level will produce the reverse action, controlling the pressure according to the broadest aspect of the invention. The orifice 36c can be of any required shape to give any desired control characteristic to the system.

I claim:
1. A device for regulating fluid pressure in a chamber comprising
   a fluid pump,
   conduits in communication with said pump and in communication with a constant pressure fluid reservoir and with said chamber, said conduits having portions defining:
   a first effective orifice between the inlet side of said pump and the constant pressure fluid reservoir,
   a second effective orifice between said inlet and said chamber,
   a third effective orifice between the outlet side of said pump and said fluid reservoir, and
   a fourth effective orifice between said outlet side and said chamber,
   all four of said orifices being at least partially open to allow continuous simultaneous fluid pressure communication between both sides of said pump and both the constant pressure fluid reservoir and the chamber, and the conduit portions which define at least two of said orifices being variable so as to alter their sizes and correspondingly the fluid discharge coefficients thereof, and a flow regulator controlling said variable orifices to vary the chamber fluid pressure over a continuous range of pressures.

2. The device of claim 1 wherein said conduit portions and said flow regulator are so arranged that said range of pressures spans the constant pressure in said reservoir.

3. The device of claim 1 wherein the conduit portions which define the variable orifices comprise portions of a three-way valve providing a common connection between the conduits which contain such last named conduit portions and arranged for simultaneously altering in opposite sense said fluid discharge coefficients in said variable orifices.

4. A device for regulating the stock level in an air loaded headbox for a paper making machine comprising
a fluid pump,
conduits in communication with said pump and with the atmosphere and with said headbox, said conduits having portions defining:
a first effective orifice between the inlet side of said pump and the atmosphere,
a second effective orifice between said inlet and the headbox,
a third effective orifice between the outlet side of said pump and the atmosphere, and
a fourth effective orifice between said outlet side and said headbox,
all four of said orifices being at least partially open to allow continuous simultaneous fluid pressure communication between both sides of said pump and both the atmosphere and said headbox, and
the conduit portions which define at least two of said orifices being variable so as to alter their sizes and correspondingly the fluid discharge coefficients thereof, and
a sensor mounted to sense a change in stock level and operatively connected to the conduit portion which define the variable orifices to automatically alter the air discharge coefficients thereof in response to any such change, whereby the headbox air pressure is changed within said range of pressures to reverse said change in stock level.

5. The device of claim 4 wherein said conduit portions and said sensor are so arranged that the headbox air pressure is changed within a continuous range of pressures spanning atmospheric pressure.

6. The device of claim 4 wherein
the orifices located between the sides of said pump and the headbox in those conduits which connect the pump to the headbox are invariable,
the last mentioned conduits include a common conduit communicating with the headbox and both sides of the pump through the invariable orifices,
the orifices between the sides of the pump and the atmosphere are variable and comprise respectively two ports of a continuously adjustable three-way valve having its common port communicating with the atmosphere, the other ports establishing communication with the conduits for connecting each side of the pump to the atmosphere, and
said sensor includes a control mechanism responsive thereto for regulating the position of said three-way valve to respectively increase and decrease the air discharge coefficients of the ports communicating with the discharge and intake sides of the pump when said stock level decreases and respectively increase and decrease the air discharge coefficients of the ports communicating with the intake and discharge sides of the pump when said stock level increases.

References Cited

UNITED STATES PATENTS 3,135,652 6/1964 Smith _____ 162—259

FOREIGN PATENTS 1,118,593 11/1961 Germany.

S. LEON BASHORE, Primary Examiner

R. D. BAJEFSKY, Assistant Examiner

U.S. Cl. X.R.

137—209; 162—252, 339, 340